United States Patent
Lahiri et al.

(10) Patent No.: US 7,734,580 B2
(45) Date of Patent: Jun. 8, 2010

(54) READABLE PHYSICAL STORAGE REPLICA AND STANDBY DATABASE SYSTEM

(75) Inventors: Tirthankar Lahiri, Palo Alto, CA (US); Kiran Goyal, Foster City, CA (US); Jia Shi, Redwood City, CA (US); Wei-Ming Hu, Palo Alto, CA (US); Neil MacNaughton, Los Gatos, CA (US); Jaebock Lee, Sunnyvale, CA (US); Bharat Baddepudi, San Jose, CA (US); Yunrui Li, Fremont, CA (US); J. William Lee, Belmont, CA (US); Vipin Gokhale, Fremont, CA (US); Mark Dilman, Sunnyvale, CA (US); Niloy Mukherjee, Belmont, CA (US); Vinay Srihari, San Mateo, CA (US); Kumar Rajamani, San Ramon, CA (US); Hochak Hung, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 315 days.

(21) Appl. No.: 11/818,975

(22) Filed: Jan. 29, 2007

(65) Prior Publication Data
US 2008/0235291 A1   Sep. 25, 2008

(51) Int. Cl.
*G06F 17/30* (2006.01)
(52) U.S. Cl. .................. 707/609; 707/610; 707/611; 707/615; 707/635

(58) Field of Classification Search .............. 707/200, 707/201, 202, 203, 204, 609, 610, 611, 615, 707/635
See application file for complete search history.

(56) References Cited

U.S. PATENT DOCUMENTS

| | | | | |
|---|---|---|---|---|
| 5,423,037 | A * | 6/1995 | Hvasshovd | 707/202 |
| 5,555,404 | A * | 9/1996 | Torbj.o slashed.rnsen et al. | 707/202 |
| 5,581,753 | A * | 12/1996 | Terry et al. | 707/201 |
| 6,691,139 | B2 * | 2/2004 | Ganesh et al. | 707/204 |
| 7,076,508 | B2 * | 7/2006 | Bourbonnais et al. | 707/202 |
| 7,155,463 | B1 * | 12/2006 | Wang et al. | 707/204 |
| 7,222,136 | B1 * | 5/2007 | Brown et al. | 707/202 |
| 7,287,034 | B2 * | 10/2007 | Wong et al. | 707/101 |
| 7,290,017 | B1 * | 10/2007 | Wang et al. | 707/204 |
| 7,464,113 | B1 * | 12/2008 | Girkar et al. | 707/200 |
| 7,644,084 | B2 * | 1/2010 | Rapp | 711/147 |

* cited by examiner

*Primary Examiner*—Jean M Corrielus
(74) *Attorney, Agent, or Firm*—Hickman Palermo Truong & Becker

(57) ABSTRACT

A standby database system or another replica data system replicates changes, made to data blocks at a source database system or another primary data copy, to replicas of the data blocks at the standby database system or other replica. While replicating the changes to the data blocks thereof, the standby database system (or other replica) receives queries (or reads) issued thereto and computes the queries based on data read from the data blocks thereof.

32 Claims, 5 Drawing Sheets

READABLE PHYSICAL STORAGE REPLICA AND STANDBY DATABASE SYSTEM

TECHNOLOGY

The present invention relates generally to database management, storage replica and related systems, and more specifically, to standby database systems and remote mirroring.

BACKGROUND

Information can be important and valuable and procedures are undertaken to protect it. In a procedure referred to as data replication, modern enterprises replicate data that is primarily updated and or accessed at a storage system, referred to herein as a "primary data system" (sometimes called a source data system), is replicated or duplicated at another storage system or location, referred to herein as "replica data system." The data stored at the primary system is referred to herein as primary data or a primary copy and the data stored at the replica system is referred to as replica data or a replica copy.

Database systems (DBMSs) are often protected using replication. Typically, one DBMS maintains the primary copy of a database and another database system, referred to herein as a standby database, maintains a replica of the primary copy. The standby database system is used to back up (or mirror) information stored in the primary database system or other primary copy.

For a DBMS protected using replication, data files, redo log files and control files are stored in separate, logically or physically identical images on separate physical media. In the event of a failure of the primary database system, the information is preserved, in duplicate, on the standby database system, which can be used in place of the primary database system.

The standby database system is kept up to date to accurately and timely reproduce the information in the primary database system. Typically, archived redo log records ("redo records") are transmitted automatically from the primary database system to the standby database system. Information from the redo logs is used to replicate changes on the primary database system to the standby database system.

There are two types of standby database systems, a physical standby database system and logical standby database systems, which differ in the way they archive information. In a physical standby database system, changes are made using physical replication. Under physical replication, updates made to a data unit of contiguous storage (herein "data unit") at the primary data system are made to corresponding data unit replicas stored at the replica system. In the context of database systems, changes made to data blocks on the primary database system are replicated in replicas of those data blocks on the physical standby database system.

A data block is an atomic unit of persistent contiguous storage used by a DBMS to store database records (e.g. rows of a table). Thus information stored on the primary database system is thus replicated at the lowest atomic level of database storage space and a physical standby database system is essentially a physical replica of the primary database system. When records are read from persistent storage, a data block containing the record is copied into a buffer of DBMS's buffering system. The buffer usually contains many other rows and control and formatting information (e.g., offsets to sequences of bytes representing rows or other data structures, lists of transactions affecting rows).

To replicate changes from the primary database system, the standby database system scans the redo records generated for the primary database system. Redo records record changes to data blocks between a previous version of a data block and a subsequent version of the data block. A redo record contains enough information to reproduce the change to a copy of the previous version. Using information in a redo record to reproduce a change recorded by the record to a copy of the previous version of the data block to produce the subsequent version of the data block, is an operation referred to herein as applying the redo record.

Another approach to replicating data is that of the logical standby database system. With the logical standby database system approach, DBMS commands that modify data on the primary system are in effect re-executed on a logical standby database system to essentially duplicate the changes made to the primary database. While executing the same DBMS commands guarantees that changes are replicated at the transactional level, the changes are not replicated at the data block level.

For various reasons, this change in replication strategy allows a logical standby database system to be available for reporting applications while replication is being performed. The ability to support reporting with data known to be fresh and without having to lag in updates is beneficial because it allows use to be made of the redundant hardware instead of just having it serve singly as a backup system.

Physical standby database systems typically have comparatively high performance, relative to logical standby database systems. However, a physical standby database system is unavailable for read operations unless application of redo records from the primary database system is stopped. However, delays in updating the physical standby database system, such as are caused by stopping application of redo while the standby database is open for reads, may allow it to lag to a greater degree from the primary database system. This concomitantly exposes fresh data in a primary database system to the risk of corruption or loss without adequate archived backup information available. Delays in updating the physical DBMS also introduce the possibility of read operation on data that may increasingly be at variance from the primary database system.

Thus, there is a need to allow read operations to physical standby databases in a way that eliminates or minimizes delays to updating the physical standby database system.

Physical replication in other contexts has similar limitations and needs. For example, in remote mirroring, data on a primary disk volume or file system is replicated on replicas of the primary disk volume or file system. The data units physically replicated are sectors, which are the atomic units of contiguous store read and written to disk. The data units of a primary disk volume or file system are replicated on the replicas of the disk volume and file systems. The changes to data units are recorded by change descriptions. Information about changes in a change description is used to reproduce the changes to copies of the sectors.

Therefore, there is a need for any system using physical replication to allow read operations to replicas to be performed in a way that eliminates or minimizes delays to updating the replica with changes to primary data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Example embodiments relating to a readable physical storage replica and standby database system are described herein. In the following description, for the purposes of explanation, numerous specific details are set forth in order to provide a thorough understanding of the present invention. It will be apparent, however, that the present invention may be practiced without these specific details. In other instances, well-known structures and devices are referred to without exhaustive treatment, in order to avoid unnecessarily obscuring the present invention.

Overview

Described herein are mechanisms for replication that allow changes made at a primary copy of data to be applied to a replica the data while concurrently allowing read operations to be performed on the replica. The mechanisms are described in the context of a DBMS, but the present invention is not limited. The mechanisms may be used for other forms of systems, including remote mirroring systems.

In the context of DBMS replication, a standby database system (hereinafter "standby database") replicates changes, made to data blocks at a source database system, to replicas of the data blocks at the standby database system in an embodiment. While replicating the changes to the data blocks thereof, the standby database system receives queries issued thereto and computes the queries based on data read from the data blocks thereof. In an embodiment, the standby database maintains a latest-readable query time, with which the queries are computed consistently with transactions committed on the primary database system. In an embodiment, the latest-readable query time is maintained based on which redo records for the primary database have been applied to the data blocks of the standby database. In an embodiment, the standby database maintains cache coherency for cursors and other meta-data cached therewith. In some embodiments, the standby database system and/or the primary database system comprise multi-node systems.

Example DBMS Environment

Figure 1:
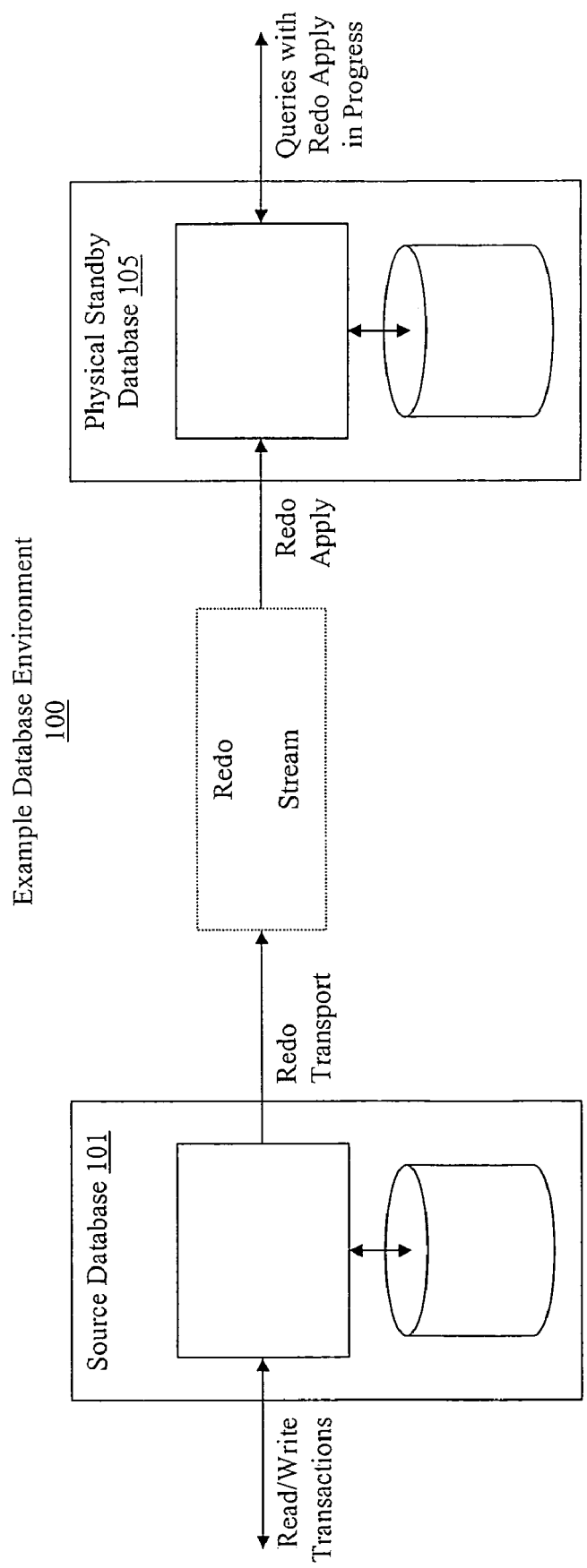
FIG. 1 depicts an example database environment in which an embodiment of the present invention may be practiced.

FIG. 1 depicts a source and standby database system 100 according to an embodiment of the present invention. Standby database system 105 is a physical standby database system for primary database system 101. From a redo log of primary database system 101, standby database system receives a stream of redo records (a redo stream) and applies them to data blocks of the database of standby database system 105. Redo log records are stored in the redo log in the order that the redo log records are generated. The redo log records occur in the same order in the redo stream as they do in the redo log. Multiple processes running within standby database system 105 each apply a subset of redo records from the redo stream to data blocks within standby database system 105. The redo records are not applied in the same order that they occur in the stream. However, with respect to a given the block, the redo records are applied in the relative order the records occur in the stream.

While standby database system 105 applies redo records from the redo stream, standby database system 105 is able to compute queries submitted by, for example, a user. Standby database system 105 is able to compute queries that reflect a consistent state of the primary database system 101 that is no later than the latest-readable query time. The latest-readable query time is calculated by the standby database system 105 based on the records applied from the redo stream.

Redo log records include other kinds of records other than redo records. For example, a redo record may include a commit record, which is generated when a transaction is committed. The redo records for a transaction occur earlier in order in the redo log and redo stream than a commit record for the transaction.

As transactions are committed by a database system, the database system transitions from one transactional consistent state to another transactional consistent state. A transactional consistent state is one in which a database of a database system is able to reflect all changes made by committed transactions and none of the changes made by the uncommitted transactions.

A logical time is associated with each consistent state. The logical time for a subsequent consistent state is later than the logical time for the previous consistent state. An example of a logical time is a system change number (SCN), sometimes referred to as a system change notice or sequence commit number. Each commit of a transaction is associated with a SCN. A counter for the SCN is incremented when ever a transaction is committed and/or the commit record for the transaction is generated. The transaction and its commit record are associated with the new counter value or SCN. Transactions recorded with redo records are associated with their corresponding SCNs therein.

Embodiments of the invention are further illustrated herein within the context of SCNs. However, the present invention is not limited to a logical time in the form of an SCN.

In order to compute a query that is consistent with the state of primary database system 101 at a particular SCN, all the redo records associated with that SCN or a previous SCN must have been applied by the standby database system 105. Thus, when standby database system 105 has determined records for a particular SCN and all previous SCNs have been applied, it advances the latest-readable SCN (i.e. latest-readable query time) to that particular SCN.

A query may be represented by a database statement that conforms to a database language. Examples of database languages include a Structured Query Language (SQL) that conform to American National Standards Institute (ANSI) standards, and propriety forms (e.g. PL/SQL, other SQL standards of Oracle Corporation).

Consistent Read

When a query is computed by a primary database system 101 and standby database system 105, it is computed relative to an SCN. The results computed reflect the consistent state associated with the SCN. According to an embodiment, such consistency is provided using a consistent read approach.

A consistent read approach is one that provides results of queries based on a particular SCN, including a past SCN, which is referred to herein as a snap shot time. For example, in primary database system 105, for a snapshot time, a data block may contain changes for a later SCN (i.e. made by transactions with later SCNs), or changes for uncommitted transactions. To determine the previous state of the data block for the snap shot time, primary database system 101 undoes the changes by applying undo records. The results of the query are based on the resulting snap shot of the data block, i.e. the state of the data block at the snap shot time.

Like a redo record, an undo record records a change made by a transaction to a data block, between the version of the data block previous to the change and the subsequent version of the data block resulting from the change. Furthermore, an undo record contains enough information to reproduce the previous version from a copy of the subsequent version. Using information in an undo record to reproduce a subsequent version of a data block prior to the change recorded by the undo record, is an operation referred to herein as applying the undo record. Thus, according to an embodiment, consistent read involves applying undo records needed to undo changes made to a data block prior to the snapshot time of the query.

Undo records are stored in data blocks. Addition of undo records to a data block, like other changes to data blocks, is recorded by a redo record. The standby database system 105 replicates the undo records by applying redo records that record the addition undo records to data blocks.

Consistent Read Deferral

When standby database system 105 needs to apply undo records to a data block for purposes of consistent read, it is possible that the undo records are not available. This situation occurs because the redo records for a change to a data block may be applied in advance of applying the redo records for the undo records. When the undo records are not available, the application of the undo records may be deferred until the redo records for the undo records have been applied.

Note this situation does not normally occur in primary database system 101. The reason for this is that whenever changes are made to a data block, the undo records are generated for the change. As a result, undo records should always exist and be available to apply to a data block for any changes that have made to a data block.

Special Considerations for Special Caches

To replicate changes from primary database system 101, standby database system 105 operates in "recovery mode" in which it directly modifies data blocks in the database of standby database system 105. This involves applying redo records to copies of the data blocks in the data block cache buffers that hold the data blocks. Generally, for data blocks that are stored in a data block cache, standby database system 105 may generate a snap shot for a particular snap shot time or latest-readable query time.

Figure 2:
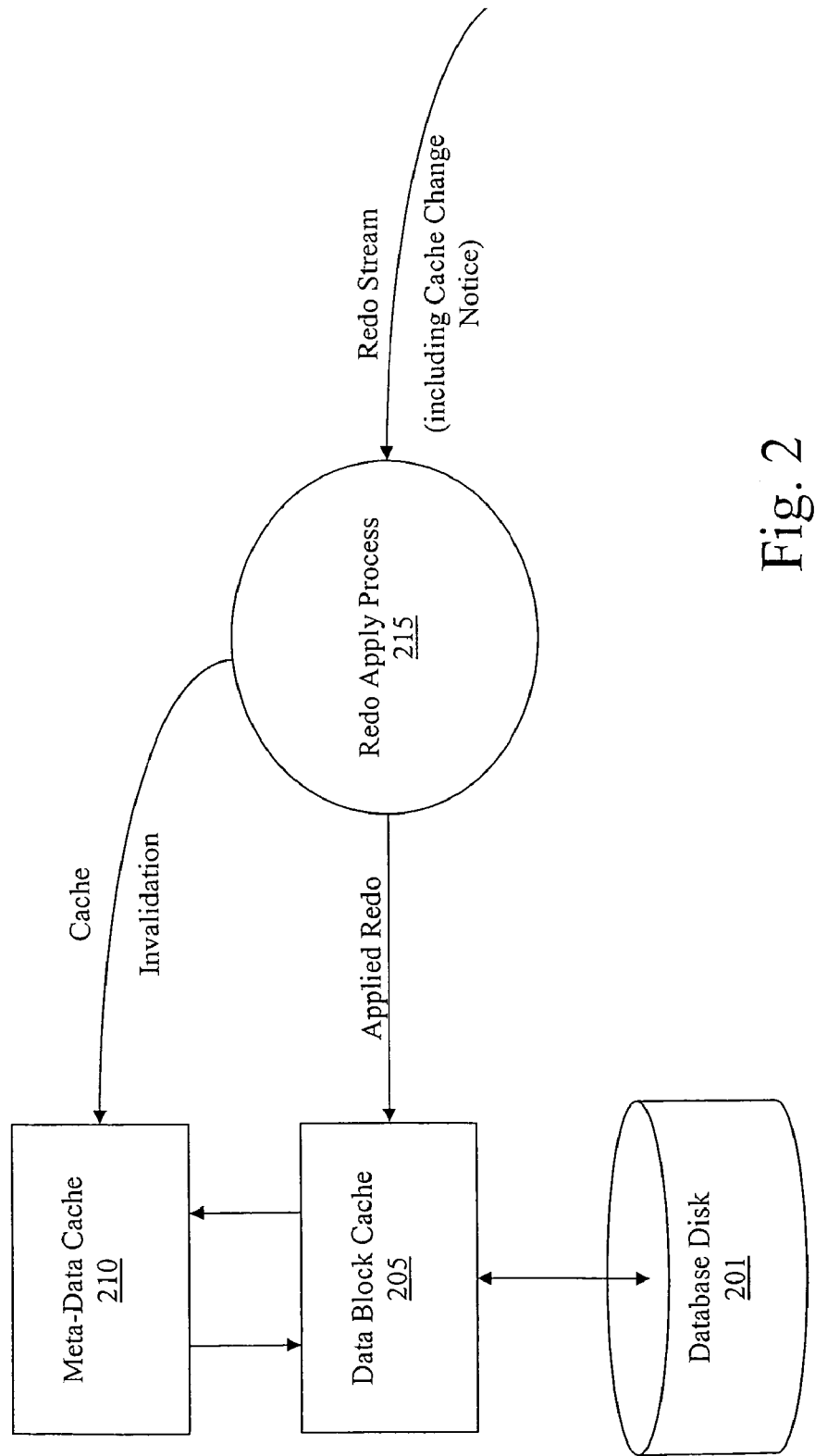
FIG. 2 depicts an example process, according to an embodiment of the present invention.

However, a database system may contain caches of data for which a snap shot like state may not be or is not generated, for example, by applying redo and/or undo records, as shall be explained in greater detail. FIG. 2 illustrates such caches on standby database system 105.

Referring to FIG. 2, it shows database 201 of standby database system 105, and various caches used by standby database system 105. These include data block cache 205 and meta-data cache 210. Data block cache 205 comprises buffers of a data block buffering system of standby database system 105. Meta-data cache 210 caches meta-data items that describe various database objects for database 201. Examples of meta-data items cached within the meta-data cache 210 include meta-data describing tables, columns, views, and table spaces, and shared cursors for commonly executed queries. Primary database system 101 also includes a meta-data cache.

It should be understood that generally, cached meta-data can be derived from data and might not directly correspond to any data block. Some meta-data that is stored in a database for example may not have any associated version information such as an SCN, e.g., for performance factors, and thus consistent read is deterred therewith. Primary database updates that require meta-data changes are done through the meta-data cache, which prevents readers from getting inconsistent data from the cache during the update. However, updates on the standby database are done through redo application directly to the data block cache and thus cannot be propagated to cached meta-data, which can cause inconsistent query results. Ultimately, many of the meta-data items cached in meta-data cache 204 are stored within data blocks. According to an embodiment, the meta-data items are not stored data blocks in such a way that consistent read operations may be performed on these data blocks or meta-data items by either the primary database system 101 or standby database system 105. However, primary database system 101 maintains coherency between the cached meta-data items and data blocks that store them as follows. Upon commit of change affecting meta-data item, the changes are made, in effect, to both the data block in data block cache and the copy of the meta-data item in meta-data cache. This form of coherency is referred to herein as meta-data cache coherency.

A standby database system that is running in recovery mode makes only changes to the data blocks, and does not make changes to meta-data cache. Therefore, its meta-data cache may not be coherent with its data blocks in the same sense that it is on a primary database system 101. Thus, the meta-data cache is coherent and consistent with the latest transactional consistent state of primary database system 101 and its corresponding SCN. Therefore, a mechanism is needed to provide meta-data cache coherency on standby database system 105. According to an embodiment, meta-data cache coherency is provided by the procedures depicted in FIG. 3 and FIG. 4.

Figure 3:
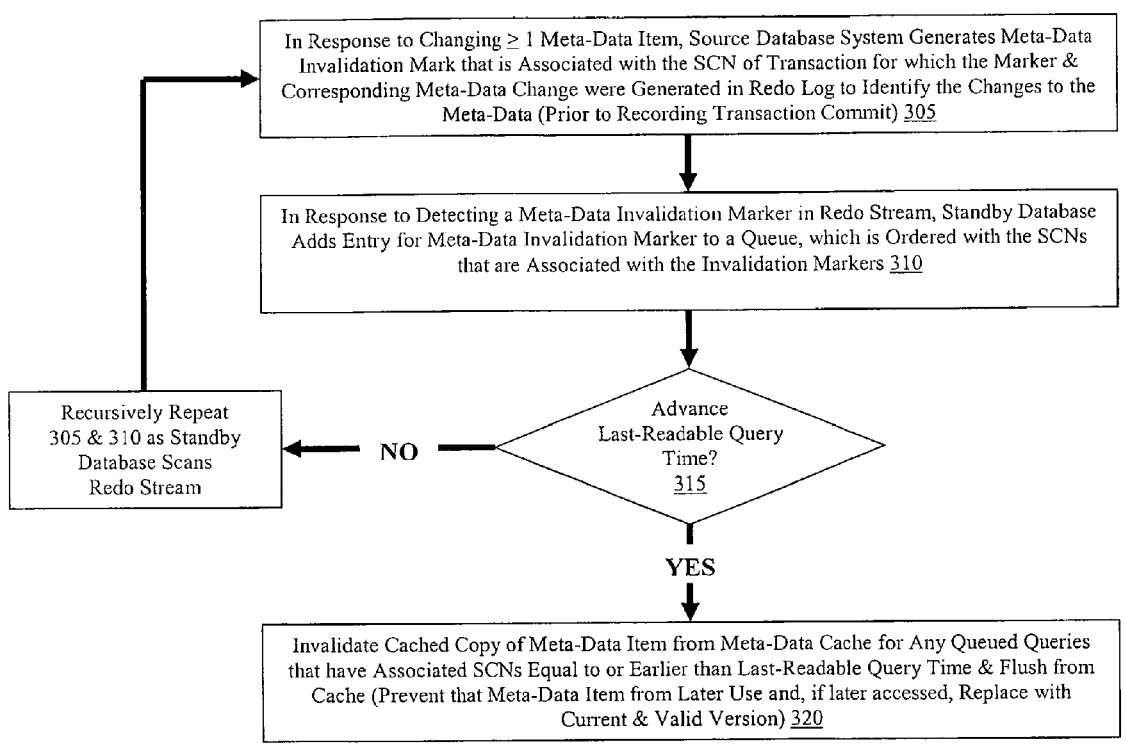
FIG. 3 depicts an example process for maintaining cache coherency, according to an embodiment of the present invention.

Referring to FIG. 3, at step 305, in response to changing a meta-data item, the primary database system 101 generates a meta-data invalidation mark, which is a redo log record that identifies a change to one or more meta-data items. The redo log records the meta-data invalidation marks along with redo records, commit records and perhaps other information.

The meta-data invalidation mark should be generated before the transaction commit record. In this way, standby database system 105 sees and account for all changes made by a transaction before it reaches the transaction commit record, including changes recorded by redo records and the meta-data invalidation marker. The meta-data invalidation marker is associated with the SCN of the transaction for which the marker and corresponding meta-data change were generated. The SCN corresponding to a transaction is sent therewith in the redo stream.

At step 310, in response to detecting a meta-data invalidation marker in the redo stream, standby database system 105 adds an entry for the meta-data invalidation marker to a queue ordered by the SCNs associated with the markers. Steps 305 and 310 are repeated as standby database system 105 scans the redo stream.

The remainder of the steps shown in FIG. 3 are performed when standby database system 105 has determined to advance the last-readable query time.

At step 315, standby database system 105 determines that the last-readable query time should be advanced to a new last-readable query time.

At step 320, standby database system 105 finds one or more entries, if any, in the queue associated with an SCN equal to or earlier than the new last-readable query time. For each such entry, standby database system 105 invalidates the cache copy of the corresponding meta-data item from meta-date cache 205. This prevents the cached item from being later used and causes the entry to be flushed, and, if later accessed, replaced with a current and valid version. Finally, the entries found are removed from the queue.

In another embodiment, cache invalidation is performed at a higher level of granularity. Rather than tracking changes to individual meta-data items, the mere occurrence of any meta-data item change triggers generation of an invalidation marker similar to a meta-data invalidation marker described earlier, except that the marker does not identify any particular meta-data item. When standby database system 105 determines to advance up to or past the SCN associated with such a marker, it invalidates the entire meta-data cache 205.

Lazy Invalidation

Figure 4:
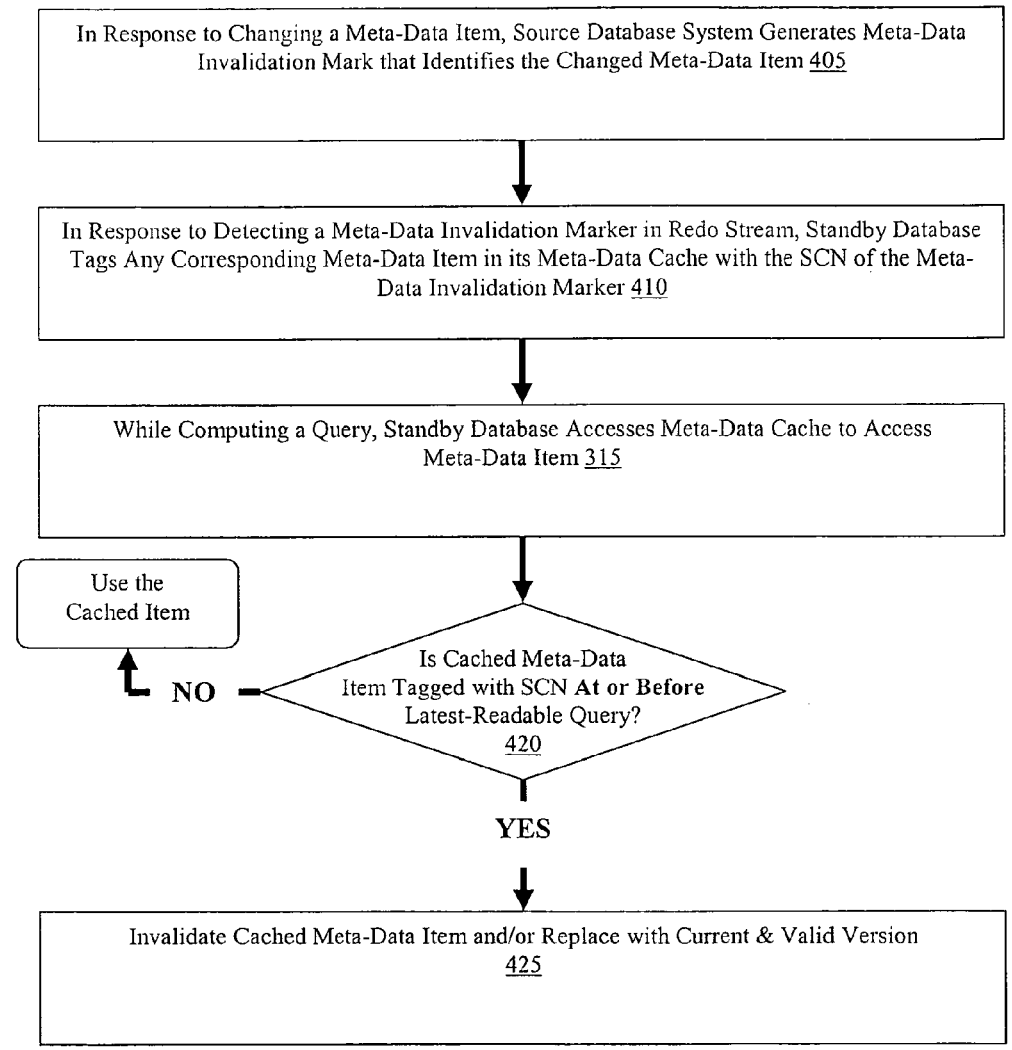
FIG. 4 depicts an example process for deferred cache coherency maintenance, according to an embodiment of the present invention.

According to another embodiment of the present invention, meta-data cache 205 is invalidated more lazily. In general under this approach, invalidation and/or replacement of a cached meta-data item may be deferred until access to the item is needed, rather than earlier when the latest-readable query SCN is advanced. FIG. 4 illustrates an embodiment for invalidating the cache in this way.

Referring to FIG. 4, at step 405, in response to changing a meta-data item, the primary database system 101 generates a meta-data invalidation mark that identifies the changed meta-data item.

At step 410, in response to detecting a meta-data invalidation marker in the redo stream, standby database system 105 tags a corresponding meta-data item in meta-data cache 205 (if there is one) with the SCN of the meta-data invalidation marker.

The remainder of the steps shown in FIG. 4 are performed when standby database system 105 accesses the meta-data cache 205.

At step 415, while computing a query, standby database system 105 accesses meta-data cache 205 to access a meta-data item.

At step 420, standby database system 105 determines whether the cached meta-data item is tagged with an SCN at or before the latest-readable query time. If so, then at step 425, standby database system 105 invalidates the cached meta-data item and/or replaces the item with a valid and current version.

Multi-Node Database Systems

According to an embodiment of the present invention, standby database system 105 as well as primary database system 101 may be multi-node database systems. A multi-node database system is made up of interconnected nodes that share access to resources. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid. A grid is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients. Among other functions of database management, a database server governs and facilitates access to a particular database, processing requests by clients to access the database.

Resources from multiple nodes in a multi-node database system can be allocated to running a particular database server's software. Each combination of the software and allocation of the resources from a node is a server that is referred to herein as a "server instance" or "instance".

According to an embodiment, each instance of standby database system 105 applies redo records within one session referred to as a recovery session. Queries are computed on each node by processes running within other database sessions. In general, the operations performed within the other database sessions upon data blocks are only read operation. Henceforth, such database sessions are referred to as read-only sessions. On the other hand, processes running within a recovery session perform write operations on data blocks.

According to an embodiment, each instance in standby database system 105 is assigned a group of data blocks to update and apply redo records. The assignment of data blocks can be based on a hashing scheme.

Processes in read-only sessions from any instance may access a data block that may be updated by another instance. A global locking mechanism is used to coordinate access to the data blocks. A global locking mechanism issues a lock on a data block that is recognized and enforced for and/or by all instances within a multi-node database system, such as standby database system 105. When a global lock is issued to a process of an instance, the global locking mechanism will not issue an incompatible global lock to any other process of the instance or another instance. For example, when write global lock for a data block is issued to a process running within a recovery session of an instance, a read global lock is not issued to another process of the instance or another node, such as a process running within a read-only session.

Finally, certain types of information must be communicated and coordinated between the instances within standby database system 105. For example, a single latest-read query SCN is determined for and communicated for all nodes. Undo records for consistency read purposes need to be transported between nodes; application of undo records on one node may be deferred until another node makes the records available.

Equivalents, Extensions, Alternatives & Miscellaneous

Thus, example embodiments relating to physical replication have been described in the context of database systems, but the present invention is not so limited. For example, an embodiment may be implemented within the context of remote mirroring systems, where the data units or data blocks correspond to sectors, redo records correspond to change descriptions, and the latest-readable query time corresponds to a latest-readable time for which read operations are performed.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Hardware Overview

Figure 5:
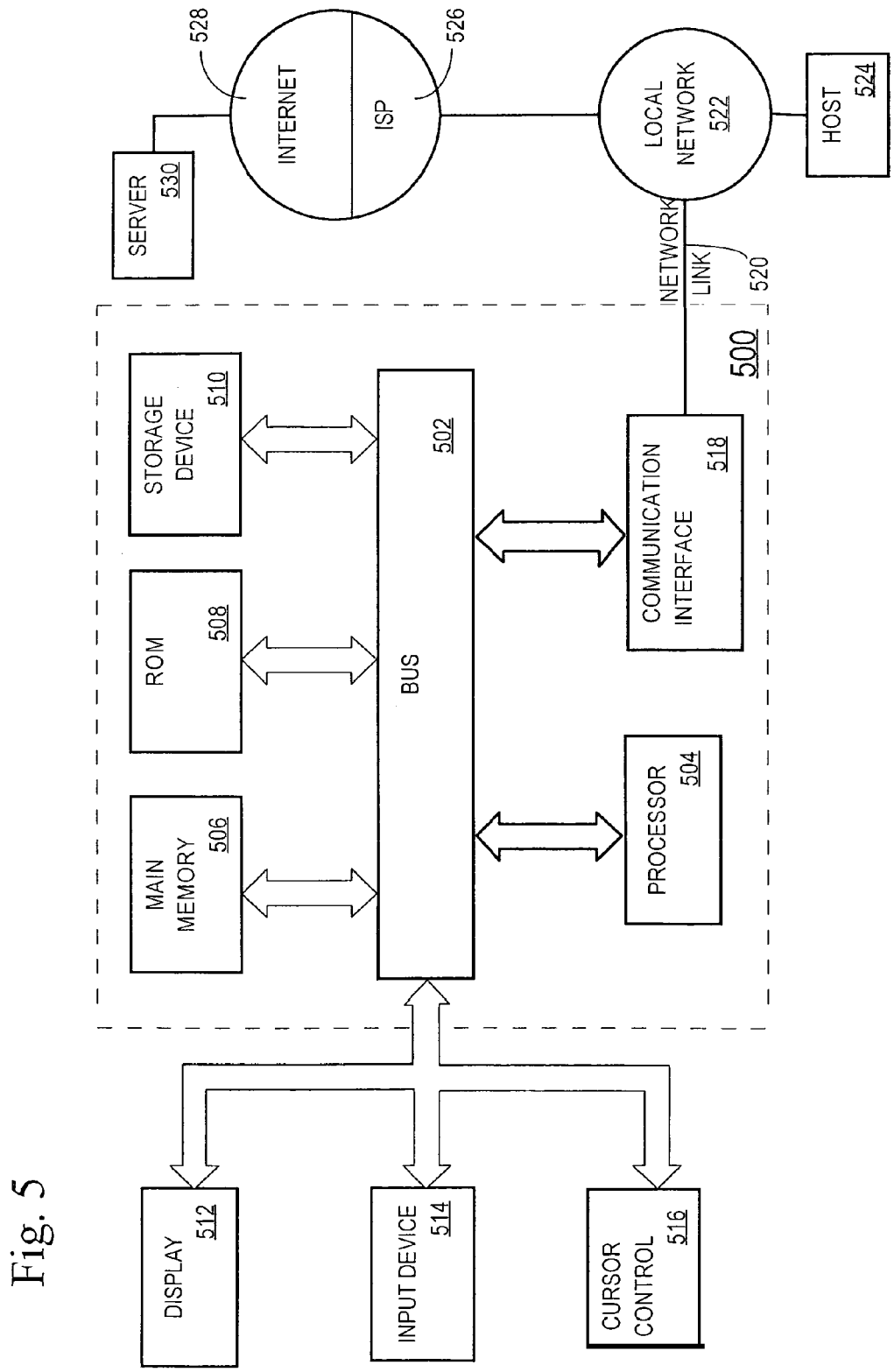
FIG. 5 depicts an example computer platform upon which an embodiment of the present invention may be practiced.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), a cathode ray tube (CRT) or the like, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Example embodiments of the invention relate to the use of computer system 500 for replicating changes, made to data blocks at a primary database system, to replicas of the data blocks at the standby database system. According to one embodiment of the invention, replicating changes, made to data blocks at a primary database system, to replicas of the data blocks at the standby database system is provided by one or more instances of computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other legacy or other physical medium with patterns of holes and other computer-readable media, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card a cable or digital subscriber line (DSL) modem or another modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for replicating changes, made to data blocks at a primary database system, to replicas of the data blocks at the standby database system, as described herein.

The received code may be executed by processor 504 as it is received, and/or stored in storage device 510, or other non-volatile storage for later execution. In this manner, computer system 500 may obtain application code in the form of a carrier wave.

What is claimed is:

1. A computer-implemented method, comprising:
a replica data system replicating changes made to data units at a primary data system to data unit replicas of the data units maintained at said replica system; and
while replicating said changes to said data unit replicas:
maintaining a latest-readable time; and
performing read operations on data unit replicas maintained at said replica system consistent with said latest-readable time;
wherein each of the above steps is performed by one or more computing devices.

2. The method as recited in claim 1 wherein at least one of said replica data system database and said primary data system comprise a multi-node system.

3. The method as recited in claim 1 wherein said latest-readable time is maintained based on which change descriptions for said primary data system have been applied to said data unit replicas of said replica system.

4. The method of claim 1, wherein said data units are disk sectors.

5. The method of claim 1, wherein said data units are data blocks storing records of a database.

6. A computer-implemented method, comprising:
a standby database system replicating changes made to data blocks at a source database system to replicas of said data blocks at said standby database system; and
while replicating said changes to said data blocks:
receiving queries issued to said standby database system; and
computing said queries based on data read from said data blocks;
wherein each of the above steps is performed by one or more computing devices.

7. The method as recited in claim 6 wherein one or both of said standby database and said primary database systems comprise a multi-node system.

8. The method as recited in claim 6, further comprising:
maintaining a latest-readable query time;
wherein said computing step comprises computing said queries consistent with transactions committed on said primary database system.

9. The method as recited in claim 8 wherein said latest-readable query time is maintained based on which redo records for said primary database have been applied to said data blocks of said standby database.

10. The method as recited in claim 8 wherein said latest-readable query time is maintained based on a plurality of transactions, wherein the complete redo records of the plurality of transactions have been applied.

11. The method as recited in claim 8, further comprising:
maintaining a certain cache of data items at the standby database system; and
invalidating one or more data items in said certain cache based on changes to the latest-readable query time.

12. The method as recited in claim 11 wherein:
the primary database system generating a redo log record indicating that a particular data item of said data items has changed at the primary database system;
said standby database system invalidating said one or more data items based one said redo log record.

13. A computer-implemented method, comprising:
a standby database system applying redo records that record changes to data blocks at a primary database system to replicas of said data blocks at said standby database system;
in response to applying all redo records for a particular logical time, advancing an established logical time for computing queries to at least said particular logical time; and
while replicating said changes to said data blocks:
receiving a query issued to said standby database system; and
computing results for said query that are consistent with said established logical time based on data read from said data blocks;
wherein each of the above steps is performed by one or more computing devices.

14. The method as recited in claim 13, wherein computing results includes said standby database system deferring completion of computing results until determining that undo records associated with said established logical time or before are received by said standby database system.

15. The method as recited in claim 13 wherein said standby database is a multi-node system database system.

16. The method as recited in claim 15 wherein said standby database system issues global locks on data blocks being modified.

17. A computer-readable medium carrying one or more sequences of instructions which, when executed by one or more processors, causes the one or more processors to perform the method recited in claim 1.

18. A computer-readable medium carrying one or more sequences of instructions which, when executed by one or more processors, causes the one or more processors to perform the method recited in claim 2.

19. A computer-readable medium carrying one or more sequences of instructions which, when executed by one or more processors, causes the one or more processors to perform the method recited in claim 3.

20. A computer-readable medium carrying one or more sequences of instructions which, when executed by one or more processors, causes the one or more processors to perform the method recited in claim 4.

21. A computer-readable medium carrying one or more sequences of instructions which, when executed by one or more processors, causes the one or more processors to perform the method recited in claim 5.

22. A computer-readable medium carrying one or more sequences of instructions which, when executed by one or more processors, causes the one or more processors to perform the method recited in claim 6.

23. A computer-readable medium carrying one or more sequences of instructions which, when executed by one or more processors, causes the one or more processors to perform the method recited in claim 7.

24. A computer-readable medium carrying one or more sequences of instructions which, when executed by one or more processors, causes the one or more processors to perform the method recited in claim 8.

25. A computer-readable medium carrying one or more sequences of instructions which, when executed by one or more processors, causes the one or more processors to perform the method recited in claim 9.

26. A computer-readable medium carrying one or more sequences of instructions which, when executed by one or more processors, causes the one or more processors to perform the method recited in claim 10.

27. A computer-readable medium carrying one or more sequences of instructions which, when executed by one or more processors, causes the one or more processors to perform the method recited in claim 11.

28. A computer-readable medium carrying one or more sequences of instructions which, when executed by one or more processors, causes the one or more processors to perform the method recited in claim 12.

29. A computer-readable medium carrying one or more sequences of instructions which, when executed by one or more processors, causes the one or more processors to perform the method recited in claim 13.

30. A computer-readable medium carrying one or more sequences of instructions which, when executed by one or more processors, causes the one or more processors to perform the method recited in claim 14.

31. A computer-readable medium carrying one or more sequences of instructions which, when executed by one or more processors, causes the one or more processors to perform the method recited in claim 15.

32. A computer-readable medium carrying one or more sequences of instructions which, when executed by one or more processors, causes the one or more processors to perform the method recited in claim 16.

* * * * *